US011100743B1

(12) United States Patent
Sealy et al.

(10) Patent No.: US 11,100,743 B1
(45) Date of Patent: Aug. 24, 2021

(54) BLOCKCHAIN-BASED ELECTION SYSTEM

(71) Applicant: S & S Crypto Technologies, Orange, CA (US)

(72) Inventors: Ryan Sealy, Layton, UT (US); Daniel Stanton, Anaheim Hills, CA (US)

(73) Assignee: S&S Crypto Technologies, Orange, CA (US)

( * ) Notice: Subject to any disclaimer, the term of this patent is extended or adjusted under 35 U.S.C. 154(b) by 227 days.

(21) Appl. No.: 16/221,487

(22) Filed: Dec. 15, 2018

Related U.S. Application Data

(60) Provisional application No. 62/612,392, filed on Dec. 30, 2017.

(51) Int. Cl.
```
G07C 13/00      (2006.01)
H04L 9/06       (2006.01)
H04L 9/08       (2006.01)
```

(52) U.S. Cl.
CPC ............ *G07C 13/00* (2013.01); *H04L 9/0637* (2013.01); *H04L 9/0643* (2013.01); *H04L 9/0825* (2013.01); *H04L 2209/38* (2013.01); *H04L 2209/463* (2013.01)

(58) Field of Classification Search
CPC ..... G07C 13/00; H04L 9/0825; H04L 9/0643; H04L 9/0637; H04L 2209/463; H04L 2209/38
See application file for complete search history.

(56) References Cited

U.S. PATENT DOCUMENTS

| | | | |
|---|---|---|---|
| 9,608,829 B2 | 3/2017 | Spanos et al. | |
| 2016/0027229 A1 | 1/2016 | Spanos et al. | |
| 2016/0028552 A1 | 1/2016 | Spanos et al. | |
| 2017/0046689 A1 | 2/2017 | Lohe et al. | |
| 2017/0048234 A1 | 2/2017 | Lohe et al. | |
| 2017/0048235 A1 | 2/2017 | Lohe et al. | |
| 2017/0061398 A1 | 3/2017 | Joseph | |
| 2017/0085545 A1 | 3/2017 | Lohe et al. | |
| 2017/0103472 A1 | 4/2017 | Shah | |
| 2017/0109955 A1* | 4/2017 | Ernest .................. | H04L 9/3257 |
| 2017/0149819 A1 | 5/2017 | Androulaki et al. | |

(Continued)

FOREIGN PATENT DOCUMENTS

| | | |
|---|---|---|
| WO | WO2016015041 | 1/2016 |
| WO | WO2016022864 | 2/2016 |

(Continued)

*Primary Examiner* — Sonji N Johnson
(74) *Attorney, Agent, or Firm* — ColterJennings

(57) ABSTRACT

A blockchain-based election system includes an owner-controlled blockchain, an election administration server, registrars for authenticating voters and providing instructions for the election, and electronic devices for casting ballots. The administration server interfaces with the blockchain to manage election rules and content. The registrars authenticate each voter's identity and issue ballots to each voter through the blockchain. The voters may cast their ballots using an election polling place device, a wallet app or another electronic device such as a computer. Once cast, the ballots are tabulated and the vote counts revealed using the blockchain. Public key encryption is used to secure each step in the election process. As a result, any authorized person or entity may verify the election results by querying the blockchain.

24 Claims, 15 Drawing Sheets

(56) References Cited

U.S. PATENT DOCUMENTS

| | | | |
|---|---|---|---|
| 2017/0221052 A1 | 8/2017 | Sheng et al. | |
| 2017/0228731 A1 | 8/2017 | Sheng et al. | |
| 2017/0232300 A1 | 8/2017 | Tran et al. | |
| 2017/0236094 A1 | 8/2017 | Shah | |
| 2019/0019367 A1* | 1/2019 | Unagami | H04L 9/3239 |
| 2019/0020471 A1* | 1/2019 | Santilli | H04L 67/306 |
| 2019/0051079 A1* | 2/2019 | Venkataraman | H04L 9/3239 |
| 2019/0158272 A1* | 5/2019 | Chopra | H04L 9/30 |
| 2019/0190724 A1* | 6/2019 | Sundaresan | H04L 9/0637 |
| 2020/0204352 A1* | 6/2020 | Thompson | H04L 9/3239 |
| 2020/0344240 A1* | 10/2020 | Robison | G06F 16/2379 |

FOREIGN PATENT DOCUMENTS

| | | |
|---|---|---|
| WO | WO2017011601 | 1/2017 |
| WO | WO2017079652 | 5/2017 |
| WO | WO2017109140 | 6/2017 |

\* cited by examiner

BLOCKCHAIN-BASED ELECTION SYSTEM

CROSS-REFERENCE TO RELATED APPLICATION

This application claims the benefit of the filing date of U.S. Provisional Patent Application Ser. No. 62/612,392, filed Dec. 30, 2017, for "BLOCKCHAIN BASED ELECTIONS AND VOTING," the complete disclosure of which is hereby incorporated herein in its entirety by this reference.

BACKGROUND

Elections of a wide variety of types have been conducted for centuries. As current examples, regular political and corporate elections decide many matters of public and private policy. Despite continued efforts to make elections both secure and open, managing an open and fair election remains elusive. The result can be serious challenges to the fairness and outcome of elections.

Existing methods of managing elections have several systemic problems. Examples of existing problems include errors or tampering with printed ballots and selection options, unauthorized individuals casting ballots, voter intimidation either at the polling site or through lack of voter anonymity, ballot-box "stuffing" with false ballots, ballots being destroyed or lost both before and after the ballot has been cast, errors or falsification of tallied results, and ambiguity or outright fraud in counting votes. These problems have not dim ished over time; in fact, looking at the U.S. political landscape, it appears such problems may actually be increasing.

Recent advancements in cryptographic technologies provide software solutions that allow for excellent transparency, and independent verification, all while maintaining end-user anonymity. In particular, the development of what are known as "blockchains" provide the fundamental cryptographic platform to track and exchange assets. Blockchains are highly resilient to hacking. For example, the currently popular Bitcoin currency as well as others are all built upon the fundamentals of blockchain technology. Bitcoin technology operates without paper money, coins, or gold stored in vaults, and tampering of blockchain stored assets is virtually impossible to achieve. The entire ledger containing the assets of every cryptocurrency holder and every cryptocurrency transaction since the currency's creation is publicly available, publicly verifiable, tamper-proof, and anonymous. These are some of the very difficulties presented by current election technologies.

SUMMARY

The present disclosure describes a system and method for implementing blockchain technology into election management, ballot preparation, voter authorization, ballot casting, and ballot tallying. The present election system ensures only authorized persons can vote, prevents an individual voter from casting more than one ballot (or more ballots than that voter is authorized to cast), prevents voters from casting ballots with more than one selection or any other invalid selection, allows for voters to cast ballots in private in their homes or on a smartphone or computer, and provides transparency that makes ballot-stuffing detectable and therefore tamper-evident. In addition, the system ensures that all ballots are accounted for and can be counted, and that ballots are counted accurately. The system ensures election results can be sealed while the election is open for voting and then unsealed for public viewing at the close of voting, permits individual voters to verify that their ballot was cast and for the selections the voter made, allows voters to verify that the ballot selections made available to them are accurate and have not been altered or tampered with, and allows for classifications of votes to support a variety of voting applications, including weighted and unweighted vote classes.

The system typically begins with the initialization of a blockchain. The owner of the blockchain submits a transaction to the blockchain that includes the owner's public key and a cryptographic signature of the transaction signed using the owner's private key, and thus verifiable using the owner's public key. The owner's public key is recorded in an application state of the blockchain. Furthermore, signatures created with the owner's private key, and verifiable with the owner's public key, constitute permission given by the blockchain owner to conduct the election using the owner's blockchain.

Next, an election key pair is created and used to establish election rules. Typically, the election rules include such things as the period of time during which ballots may be cast, what candidates and topics are to be placed on the ballots, selecting the voter base, and setting forth the rules for announcing the results of the election. Other rules may also be established. Typically, the election content is also established at or about this time, including elements describing the issues and topics presented to the voters, the candidates and options the voters may select with regard to these issues and topics, detailed information and classifications further describing the meaning and significance of these issues, topics, and candidates, and a unique identifier is assigned to each element of the election content. Also, a cryptographic digest (that is, a hash) of the election content combined with a sequence of random numbers (added for security purposes) is created.

Another transaction documenting the election is submitted to the blockchain. This transaction typically includes the election public key, the rules, the election cryptographic digest, and two cryptographic signatures of the transaction, one created with the election private key and one created with the owner's private key. Thus, these cryptographic signatures may be verified using the election public key and the owner's public key, respectively.

One or more registrars are designated for the election, each of which has its own unique registrar key pair and its own "secrecy" key pair. The maximum number of voters a registrar may authorize is also determined. Another transaction is then submitted to the blockchain. This transaction authorizes the registrar or registars to issue ballots according to the established rules. This transaction typically includes the registrar public key, the registrar's secrecy public key, the number of ballots the registrar may authorize, and two cryptographic signatures, one created with the election private key and another created with the registrar private key. These cryptographic signatures may be verified using the election public key and the registrar's public key, respectively.

Voters are then identified from one or more lists maintained by the registrar or registrars. Each voter is notified of the election, the notification including the election public key, information about how the voter can communicate with the blockchain, the election content, and contact information for the registrar. This notification can be sent by one or more methods such as electronic mail, a hyperlink to digital content, a custom format that can be interpretted by an application on the voter's computer or phone, or other means.

Voter identities are authenticated and validated by creating a voter key pair to identify the voter. The voter's private key is typically stored in a secure medium that is trusted by the voter. This medium may be a digital wallet, or other protected medium.

A ballot is created and issued to each voter by the voter presenting and verifying its identity to the registrar, then by submitting another transaction to the blockchain. This transaction typically includes the voter's public key and two cryptographic signatures, one created with the registrar private key and another created with the voter private key. Thus, these cryptographic signatures may be verified using the registrar's public key and the voter's public key, respectively.

A voter casts a ballot by accessing the blockchain and submitting inquiries to the blockchain to obtain the election rules, the cryptographic digest of the election, and to validate that a ballot was issued based on the voter's public key and that that ballot has not been revoked or already cast. At this time, the voter may also be instructed about whether the ballot will be kept secret, meaning that the voter's vote will be encrypted (or not). The voter then completes the ballot by selecting the preferred candidates or options, which may be done using a user interface provided by the voting application software or by other methods, and submits a transaction to the blockchain containing the voter's public key and the completed ballot, which ballot has been encrypted using the secrecy public key, and a cryptographic signature created with the voter's private key, and thus the ballot may be verified using the voter's public key.

The ballots are tabulated by first decrypting ballots issued by each of the registrars. For ballots cast that are not encrypted, the tally of ballot selections is updated as each ballot is cast and the transaction is processed by the blockchain. For encrypted ballots, the blockchain application stores the encrypted ballots in a list within the blockchain's application state. Ballots are decrypted at the end of the election by submitting a transaction to the blockchain containing the secrecy private key of the voter's registrar. Whereas each registrar generates and publishes its own secrecy public key on the blockchain, the ballots cast from each registrar may be decrypted at different times and with different transactions. The votes on each ballot are counted and the tallies of votes updated. Thereafter, the application state of the blockchain is updated to include the tally of votes and ballots cast. Because of the nature of blockchain, when the application state is thus updated, the vote tally is revealed in that update, and thus the election results (or partial results) can be seen. Similarly, at any point in the future a query to the blockchain application state will reveal the vote count as well as the election public key, the cryptographic digest of the election content, and any unique identifiers associated with each ballot or candidate or topic. This information in the query response can then be validated, typically using what is called in the art a Merkle Proof.

Therefore, the present disclosure provides a significant improvement in election management. Not only can secrecy of the vote be maintained, but anyone can query the blockchain application state and verify the results of the election. This results in a method that significantly improves election and ballot security.

BRIEF DESCRIPTION OF THE DRAWINGS

Other features and advantages of the present invention will be apparent from the following Detailed Description taken in conjunction with the accompanying Drawings, in which.

DETAILED DESCRIPTION

Figure 1:
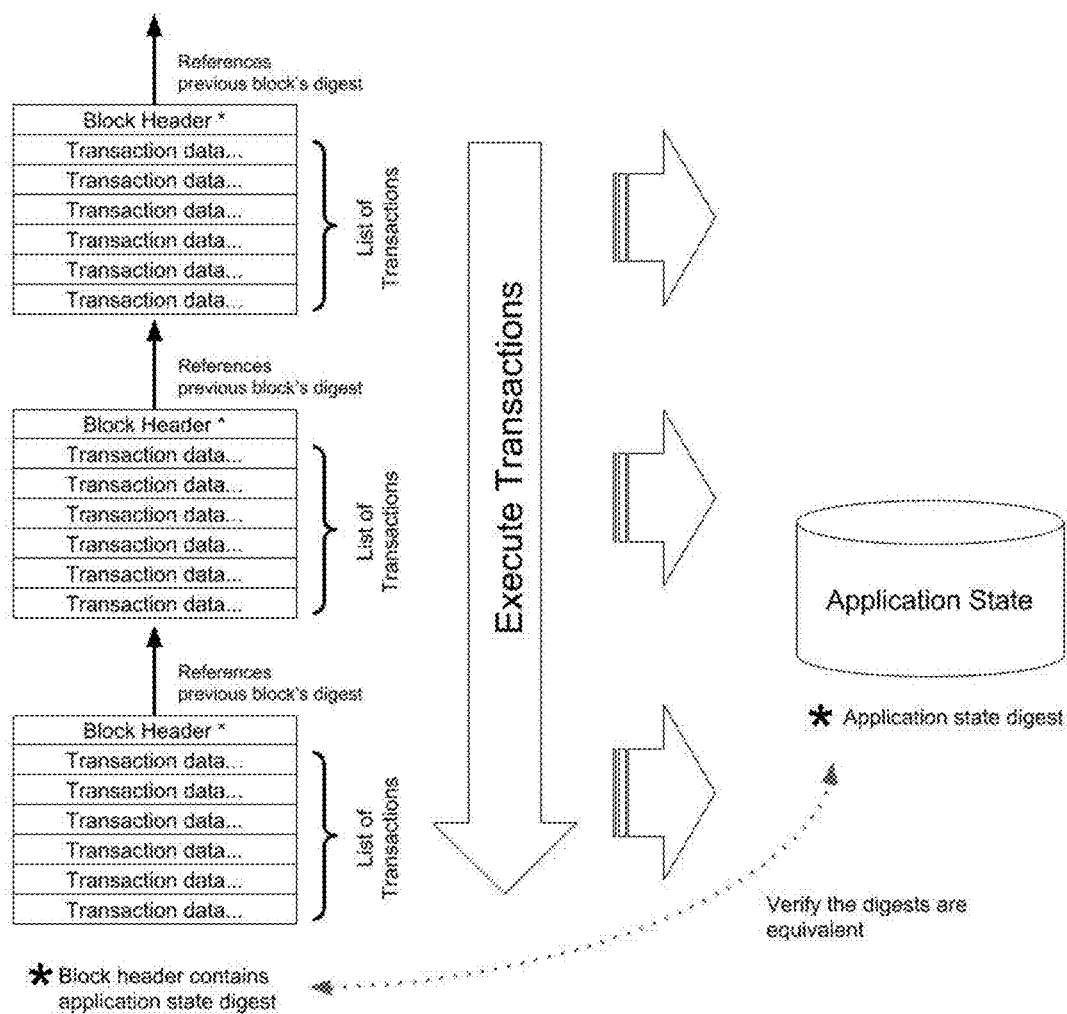
FIG. 1 depicts a schematic diagram of a blockchain executing transactions and updating the blockchain application state.

The systems and methods of the present disclosure provide for secure elections using blockchain technology and associated public key cryptography. Blockchain technology is relatively new. FIG. 1 depicts a schematic diagram of a blockchain executing transactions and updating the blockchain application state of the blockchain. The basic premise behind a blockchain is that each time a transaction is added to the blockchain, the transactions are grouped into blocks ("List of Transactions" in FIG. 1), and the blocks are digitally verifiable by creating a cryptographic digest or hash of the block's content, including a reference to the previous block's cryptographic digest or hash (referred to as "previous block's digest" in FIG. 1) and a cryptographic digest or hash of the resulting application state after the block of transactions is executed ("Application state digest" in FIG. 1). Thus anyone with access to the blockchain can examine the blocks and associated digests to ensure the transaction ledger is authentic ("Verify the digests are equivalent" in FIG. 1).

In similar fashion, any system state information can be stored and verified by the blockchain. As each transaction is processed by the blockchain, a software program examines the contents of the transaction, performing checks on the validity of the transaction, and updates an application state that tracks assets, resources, or other information needing to be securely tracked or audited. A cryptographic digest or hash of that application state is created from the modified application state, and is stored with each block.

For a transaction submitted through the blockchain to be considered valid, the rules established by the examining software application must be followed. The rules of the software program dictate how information is stored and workflows are regulated and vary by the specific requirements of the software application design. For example, in an election system, a typical software rule would prohibit an authorized voter from casting more than one ballot in a given election.

Typically, most transactions submitted to the blockchain also require that the transaction include cryptographic signatures generated by one or more private keys, held and known only to certain persons or components of the election system, as proof that the transaction was created by those authorized to do so. For example, in an election system, typically a ballot cannot be cast on behalf of a given voter without also having a signature from that voter's private key, as evidence that the ballot was cast only by the true voter. Furthermore, many transactions require the inclusion of a single use number, known in the art as a "nonce," that the software application records to the application state and uses to check for and invalidate any transaction that is resubmitted to the blockchain multiple times.

Though the transactions submitted to a blockchain are varied and cannot be predicted, the outcome and changes to the application state are predictable to anyone with an understanding of the rules and logic contained in the software program examining the blockchain transactions. Thus, if each transaction is accurately submitted, the blockchain will store that accurate transaction, and altering the transaction (such as by changing the votes contained on a ballot) will alter the hash of the blockchain application state. As a result, anyone with access to the blockchain can run the hash and verify that the resulting application state is valid.

Blockchain technology is well described in literature and on line. Typically, the present methods rely on obtaining or creating a blockchain. A blockchain platform may be acquired from companies such as Tendermint, www.tendermint.com, which produces white papers and technical documentation of their platform, see for example information presently available at www.tendermint.com/docs/. Those of skill in this art will understand this underlying technology.

Furthermore, as is known in the art, blockchain technology relies on public key encryption. That is, a user or machine or entity is assigned a key pair, a private key and a public key. The private key may be used to decrypt digital files. The public key may be used to encrypt digital files. As a result of the one-way nature of public key encryption, a file may be securely sent to a person or machine or entity by encrypting the file with that entity's public key. Only that entity's private key can then decrypt that file. Alternatively, a person or entity can digitally "sign" a file using the entity's private key, and anyone in possession of that entity's public key (which is typically published for this very purpose) can verify the signature using that public key. As a result, public key technology can be used for secrecy and for authentication or verification of identities.

The present systems rely on blockchain and public key cryptography, but are outside the scope of how blockchain is engineered. That is, blockchain and public key encryption technologies are tools that the present systems use. Rather, the present systems employ those tools to build an application having a blockchain with a transaction verification model application state resulting in a secure election system. The election system thereby includes transparency, anonymity, indestructibility, and fraud detection and prevention.

Figure 2:
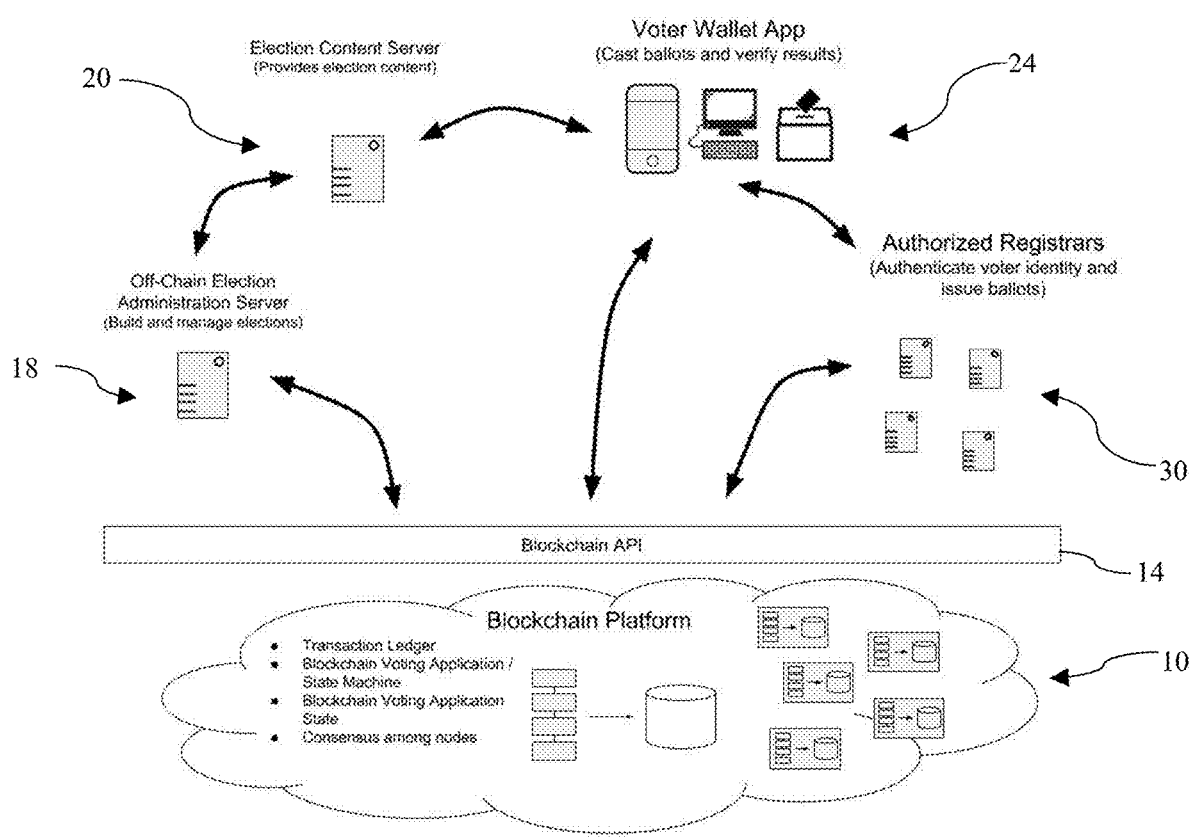
FIG. 2 depicts selected components of a blockchain-based elections system.

Some of the physical structures underpinning certain embodiments of the present systems are depicted schematically in FIG. 2. As depicted therein, various components of the systems communicate with a blockchain platform 10 through a blockchain API (application-programming interface) 14. The components depicted in FIG. 1 include an administration server 18, election content server 20, a voter wallet applet 24, and a plurality of election registrars 30, all of which communicate with the blockchain platform through the blockchain API.

FIGS. 3, 4, 5, and 6 depict transactional processes relating to the present system according to certain embodiments thereof. That is, these figures show the different activities and transcations for each of the blockchain owner, the election administration server, the registrar (or registrar server), the voter or voter software, and the blockchain during different steps of an election conducted using the present system. Each of these figures is discussed below in greater detail.

Figure 3:
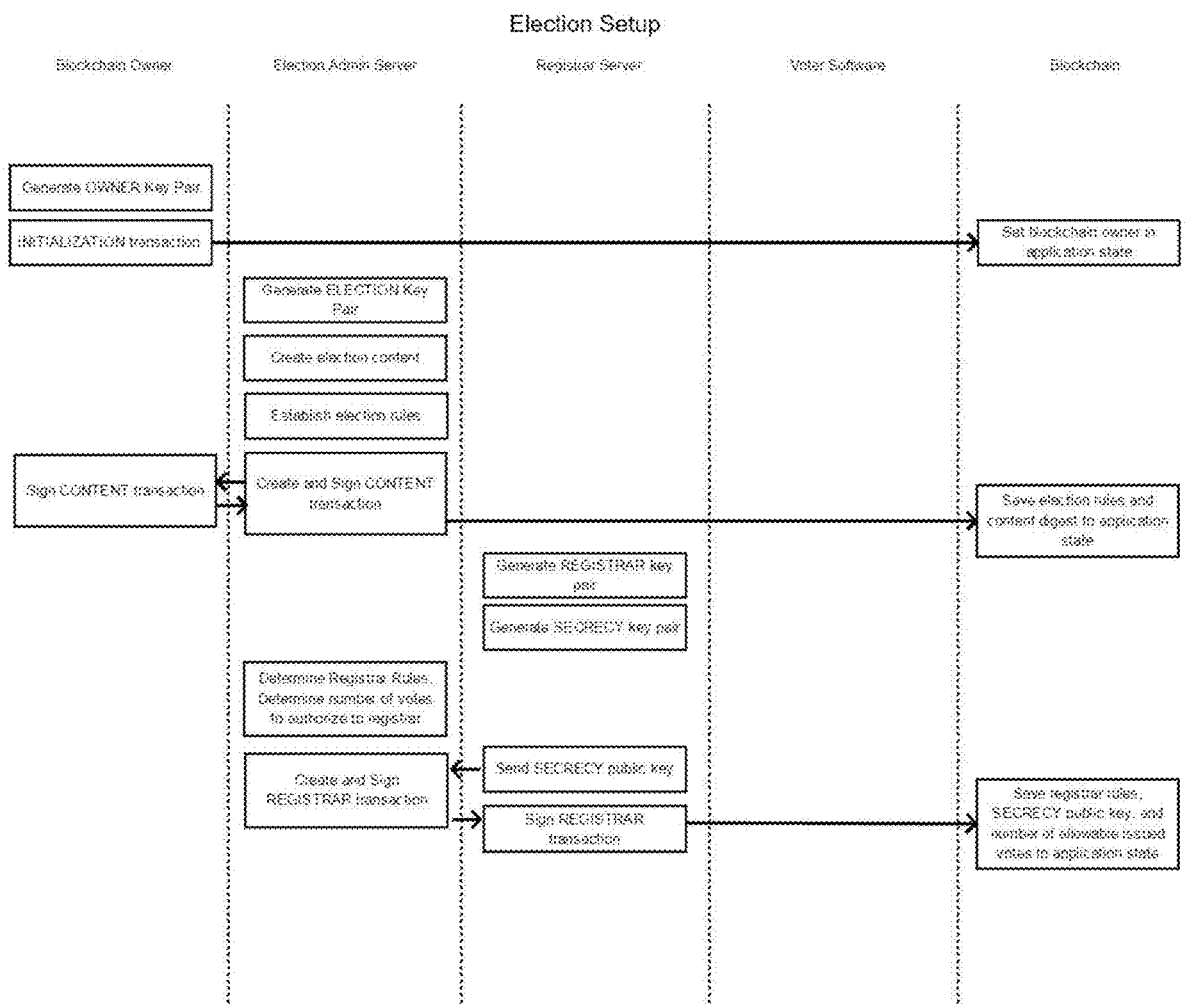
FIG. 3 depicts an exemplary view of a transactional design of an election setup according to certain embodiments of a blockchain election system.

According to some embodiments of the present systems, the process begins by acquiring or creating a blockchain. As depicted in FIG. 3, to do this, the owner of the blockchain 10 generates an owner key pair, and initializes the blockchain for use in the election by submitting an "initialization" transaction to the blockchain, which initialization transaction includes the owner's public key and a cryptographic signature of the initialization transaction that has been created using the owner's private key and is verifiable with the owner's public key. The owner's public key is recorded in the application state of the blockchain. The blockchain may then be used for the intended election.

The blockchain application examines the "initialization" transaction and sets the owner public key in the application state, if one is not already set. If an owner public key is already specified, the transaction is discarded and the application state is not modified. The initialization transaction is invalid if any of its signatures are missing or cannot be cryptographically verified.

Upon receiving permission or authorization from the owner to use the blockchain to conduct an election, the election administration server generates an election key pair, as depicted in FIG. 3. The election key pair is used to establish and promulgate rules and procedures for the election. The election rules may include many items, but typical election rules include such things as setting a time period for casting ballots for the election; determining whether candidates and topics may be added to the ballot after the election is created and, if so, when and what categories of candidates and topics may be added; determining whether a voter may cast a ballot for a candidate or topic not listed on the ballot (that is, permitting write-in votes); determining whether ballots cast may be revealed before the election voting period ends by allowing ballots to be cast without encryption, or requiring ballots to be encrypted with a public key defined by the voter's registrar and only revealed when the registrar publishes the corresponding private key at the end of a voting period. determining whether or not the voter may cast ballots for more than one candidate or topic; and determining whether or not ballots may be weighted differently for certain voters or classes of voters.

Typically, again as indicated in FIG. 3, at this point election content is also prepared. Election content refers to the material on the ballot. Election content typically includes such information as the voting elements, such as the election titles, subtiles, detailed descriptions, candidates, initiatives, propositions, topics, running mates, party affiliation, or any additional information that may be presented to voters to fully inform them about of the options and matters presented on the ballot. A unique identifier (such as incrementing integer values, that is, 0, 1, 2, 3, . . . ) is assigned to each voting element so that the voting element may be properly identified when counting the ballots.

The election content also includes a series of random numbers attached to the content. A first, "content" cryptographic digest of the election content, including the random numbers, is then created. The random numbers attached to the election content cause the "content" cryptographic digest to be unique. This renders it impossible to counterfeit the election content.

A second, "content" transaction is then submitted to the blockchain. This content transaction typically includes the election public key; the election rules; the "content" cryptographic digest; a nonce value for the transaction; a cryptographic signature of the "content" transaction created with the election private key and verifiable with the election public key; and a signature of the second "content" transaction created with the owner private key and verifiable with the owner public key. In this way, the election content and rules are included in the blockshain application state.

The use of a nonce value allows for additional "content" transactions to be submitted to the blockchain if the election content changes or rules change. For subsequent "content" transactions to be considered valid, additional checks are made to ensure the nonce value provided has not been previously used, and the previously established election rules permit the modification of the election content and rules.

The blockchain application examines the "content" transaction performing checks on the inputs provided in the transaction, and if valid, updates the application state to record the public key of the election, its rules, its election content digest, and the nonce value used. If invalid, the transaction is discarded and the application state is not modified. The content transaction is invalid if, for example:
  any of the content transaction signatures are missing or cannot be cryptographically verified;
  the content transaction attempts to modify the content digest or rules of an existing election which rules prohibit such a modification;
  the content transaction attempts to modify the content digest of an existing election, the rules for which prohibit the modification of the election content;
  the content transaction attempts to modify certain rules for an existing election, such as altering the allowable times for voting, ending the allowable time for voting early, setting whether votes must be encrypted or not, and allowing write in candidates or not, after the allowable time for voting has already begun;
  the content transaction attempts to set the allowable voting end time before the allowable voting start time; or
  the content transaction contains a nonce value that has previously been used.

As depicted in FIG. 3, election registrars are designated. The registrar or registrars are authorized to validate and authenticate voter identities and to validate and issue ballots for the election. Each registrar creates a registrar key pair, that is, a public key and a private key. Each registrar private key is kept confidential by the respective registrar, but the registrar public key is submitted to the blockchain in the "registrar" transaction, stored in the blockchain application state (which is visible to users), and is provided to each voter issued a ballot by that registrar. The maximum number of voters that each registrar may authorize is also determined; different registrars may have different maximum voter numbers, but each registrar is allocated only their own maximum. In addition, in certain embodiments, ballots may be revoked; for example, if a voter loses a ballot, that ballot may be revoked and a new ballot issued to the voter.

As also depicted in FIG. 3, each registrar may establish registrar rules for the election. Registrar rules may vary from registrar to registrar, but typically would include such matters as separate and optional times that voting is allowed for votes from this registar (in case each registrar has different voting times or different voting times than those set by the election), or whether or not votes cast from that registrar must be encrypted (in case a registrar has different requirements than those set by the election rules, or in case the election rules do not specify).

In addition to the registrar key pair, as indicated in FIG. 3, each registrar has a "secrecy" key pair, the public key of which is used by voters (for that registrar) to encrypt ballots cast by such voters. When cast, each ballot is encrypted with the secrecy public key that the voter will have received from that voter's registrar. The secrecy key pair is generated by each registrar (this is a separate key pair generated by the registrar in addition to the registrar key that is used to identify the registrar). The purpose of the secrecy key pair is that the secrecy private key may be revealed after the election, when decrypting the votes, without having to reveal the registrar private key which can be used to alter election rules for that registrar. By allowing users to learn the secrecy private key (after the election), those users can decrypt the ballots, thereby providing transparency to the election.

As depicted in FIG. 3, a third, "registrar" transaction is then submitted to the blockchain. Typically, each registrar submits a registrar transaction, and thus if there are multiple registrars, there will be multiple registrar transactions submitted to the blockchain, at least one registrar transaction per registrar. Each registrar transaction includes its registrar's public key; the number of ballots its registrar may authorize; its registrar rules; the public key of the secrecy key pair; a nonce; a cryptographic signature of the registrar transaction created with the election private key and verifiable with the election public key; and a cryptographic signature of the third registrar transaction created with the registrar private key and verifiable with the registrar public key.

The blockchain application examines the registrar transaction, and if it is valid, updates the application state to record the registrar public key, the election public key associated to the registrar, the registrar rules, the secrecy public key, the number of ballots the registrar is authorized to issue, and the nonce value provided. If the transaction is invalid, it is discarded and the application state is not modified. Typically, the registrar transaction is invalid if, for example:
  any of the registrar transaction signatures are missing or cannot be cryptographically verified;

the registrar transaction contains a nonce value that has previously been used; or the registrar transaction attempts to set the allowable voting end time before the allowable voting start time.

Voters are then identified from the registrar voter list or lists. Each voter is notified about the election. Notification can take various forms, such as by mail, electronic mail, text message, or any form of electronic of physical dissemination of a barcode or link to a registrar. The notification typically will include the election public key, information regarding how the voter may communicate with the blockchain, the election content, and contact information for the voter's registrar. The notification may also contain credentials that may be used in part or in whole to validate a voter's identity. According to current industry standards a "best practice" for securely authenticating voter identity may be to incorporate multi-factor authentication requiring the voter to possess the notification as well as provide proof of knowledge of some secret known to the voter and the registrar.

Figure 4:
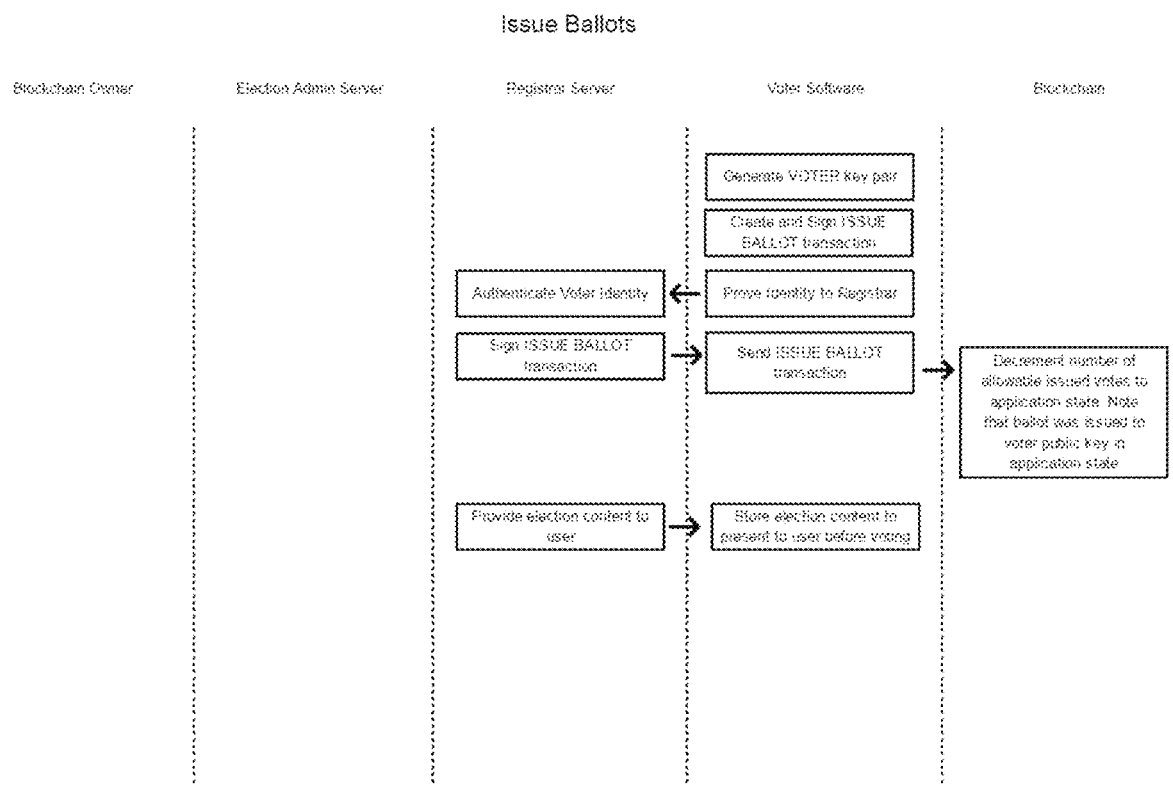
FIG. 4 depicts an exemplary view of a transactional design of issuing of ballots according to certain embodiments of a blockchain election system.

Each voter must be authenticated as a proper voter for the election. Thus, as depicted in FIG. 4, a voter key pair is created for each voter. The voter is the only one with access to the voter's private key, which is typically stored by the voter in a fashion and using a medium that the voter trusts. For example, a voter may store the voter private key on a mobile telephone, such as by using a wallet app as described. The wallet app would provide designated security, or provide the voter with the ability to choose the level of security to be attached to the private key.

According to another embodiment, the voter stores the voter private key on a personal computer or other electronic device, and refers to the private key when needed for authenticating the voter's identity. Alternatively, the electronic device may have an application that permits use of the private key and provides security to the private key. According to yet another embodiment, the voter prints the private key, in alpha-numeric form or by using other formats, such as bar codes. The voter then takes the printed private key to the polling place and uses that private key (by re-typing it or by scanning the bar code) to authenticate to the election and cast the voter's ballot.

The voter key pair, being generated from random numbers, is used to identify the voter in place of the voter's true identity. As indicated in FIG. 4, the voter must prove and the registrar must verify each voter's identity. This identification may be performed by methods known in the art, such as proving identity at the time or registering to vote or by demonstrating a right to vote, such as by being registered as a stockholder entitled to vote in a shareholder election.

According to other embodiments of the present system, verification of the voter identity between the voter and the registrar may also be performed in various ways. In some embodiments, the voter identity is authenticated using an application program interface that communicates between the voter's wallet application and the registrar. In other embodiments, a voter may be issued an individualized hyperlink that contains a voter-specific credential. Combining credentials included in the hyperlink with a voter PIN or password that is delivered to the voter through an independent method (such as an e-mail or telephone call) are used to authenticate the voter.

Voter verification can be performed in various ways in accordance with various embodiments of the present system. For example, in one embodiment the registrar sends a secret code to the voter using an "address" only the voter can access; the address could be an email address, a text message to a cell phone number, or even printed on a card sent through the postal service. For an email or SMS, the secret code can be encoded into a hyperlink the voter can click on. In any case, the code could simply be a PIN that the user must enter when verifying identity. The registrar collects the secret code from the voter using methods consistent with how the voter sent the code (which would typically be an electronic or paper communication). The voter, once verified, may electronically submit the voter public key to the registrar to obtain the registrar signature required for the issue ballot transaction.

According to another embodiment, a human being, trained to verify a person's identity either through personal knowledge or by examining physical evidence such a drivers license, verifies a voter's identity and, using software, obtains the voter's public key by scanning a barcode of the voter's public key, and then creates the registrar signature required for the issue ballot transaction and submits the issue ballot transaction to the blockchain. According to yet another embodiment, through paper records or software containing the voter registry, the registrar takes one or more pieces of information that only the true voter would be expected to know. This could be personal identifiers such as social security number, or a username and password to some system that the registrar accepts as proof of identity. Other voter verification techniques are also available, such as SSO (Single Sign On), facial recognition, or other biometrics as is known in the art.

Next, a ballot is signed and issued to each voter, see FIG. 4. When a ballot is officially issued to a voter, it is issued to the voter's public key. The voter's private key is used to authenticate the voter's ballot. That is, when casting a ballot, the voter will generate a cryptographic signature of the voter's votes using the voter private key, which is then verifiable by using the voter public key. The voter's ballot itself is encrypted with the secrecy public key, and ultimately decrypted with the secrecy private key as mentioned above.

As depicted in FIG. 4, for each ballot, a fourth, "issue ballot" transaction is then submitted to the blockchain. The issue ballot transaction includes the voter public key (to be used to identify the voter and verify the voter has been authorized to cast a ballot); a cryptographic signature of the "issue ballot" transaction created with the registrar private key and verifiable with the registrar public key; and a cryptographic signature of the "issue ballot" transaction created with the voter private key and verifiable with the voter public key.

The blockchain application examines the issue ballot transaction and, if valid, modifies the application state to record the voter public key and the registrar public key that issued the vote. The application state is also modified to update the number of votes issued by the registrar so as to prevent the registrar from issuing more votes than for which it is authorized. If the issue ballot transaction is invalid, it is discarded and the application state is not modified. The issue ballot transaction is invalid if, for example:

any of the issue ballot transaction signatures are missing or cannot be cryptographically verified;

the registrar is not authorized to issue any additional votes; or a vote has already been issued to the voter public key by any registrar.

The various valid "issue ballot" transactions thereby modify the application state of the blockchain to associate the voter, through the voter's public key, to the registrar that authenticated the voter's identity. When casting a ballot during the election, the blockchain application state stores this correlation, so that the voter key tied to the cast ballot is verified to have been authorized by a valid registrar, and has not already cast its ballot. Also, knowing to which registrar any particular vote is associated also identifies which registrar secrecy key is used to decrypt the vote. For ballots issued to voters with varying weights, a registrar may issue a single ballot to a single voter key, or in alternative embodiments, the voter creates multiple voter keys, and the registrar issues a separate ballots to each voter key so that the total aggregate voting weight equals the voting weight allocated to the voter.

Figure 5:
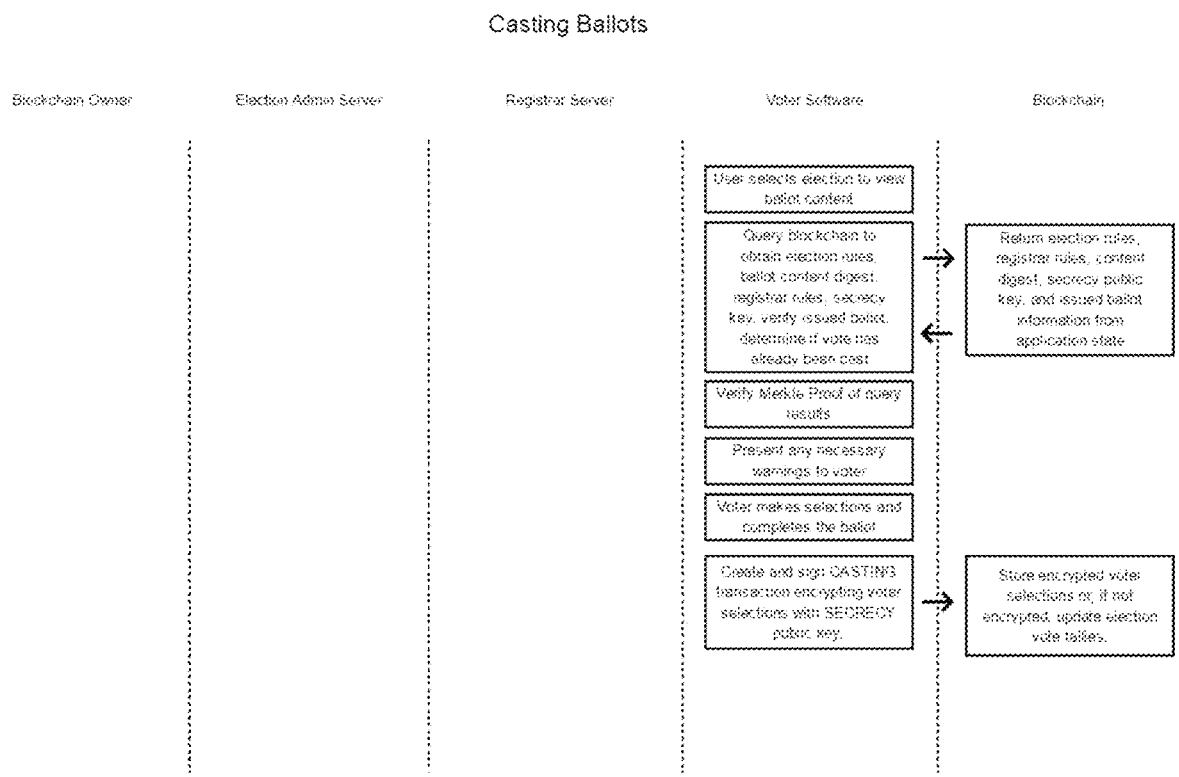
FIG. 5 depicts an exemplary view of a transactional design of casting ballots according to certain embodiments of a blockchain election system.
Figure 6:
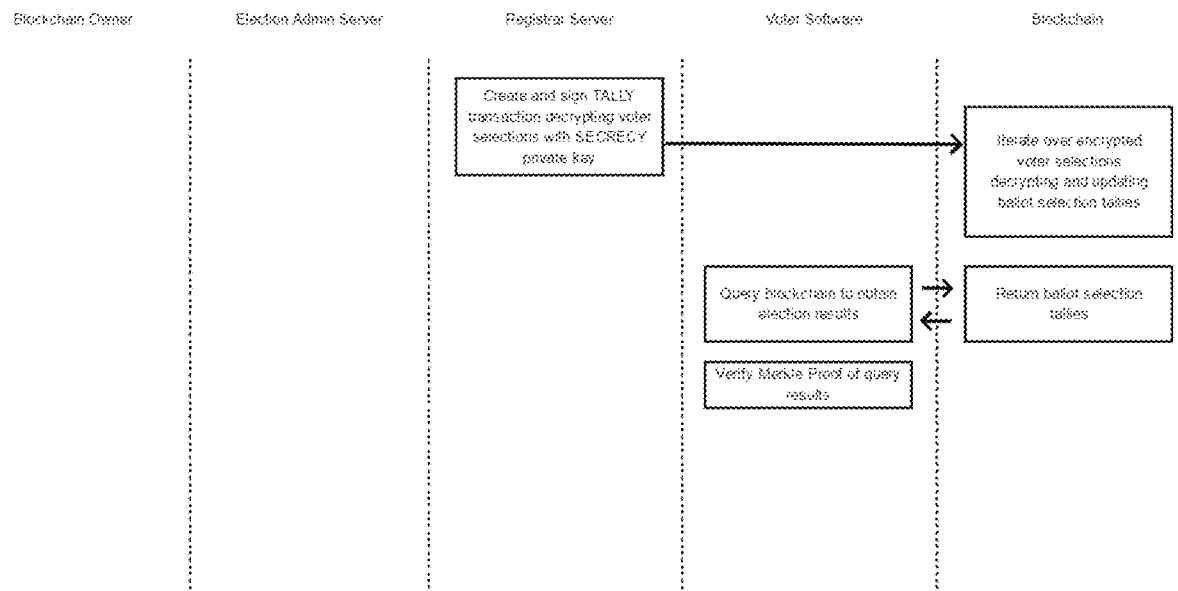
FIG. 6 depicts an exemplary view of a transactional design of revealing vote tallies according to certain embodiments of a blockchain election system.

FIG. 5 depicts the general parts of the voting process. The voter selects an election to view the election content. To display a ballot to a voter for the purpose of casting a ballot, the election content must be obtained by the voter. The election content itself is not stored on the blockchain, only the content digest. Voters obtain the election content through other sources. Typically the registrar who issues the vote will either provide the election content directly to the voter, or provide credentials that grant the voter access to the election content through the election content server. In some cases though, such as public elections, the election content may be obtained from a website, newspaper, or even a barcode on a billboard, as the election content is public knowledge. For such public elections, the election content server may deliver the election content to any person or system that requests it. For private elections where the election content is kept secret, a voter or other inquiring entity must provide evidence that they are authorized to view the election content.

Typically, the voter submits the voter public key to the election content server. The election content server queries the blockchain application state to determine if the provided voter public key is valid and was issued a ballot by a valid registrar. Then the election content challenges the voter to prove that the voter is in possession of the voter private key by sending it an encrypted message, typically containing a sequence of random numbers, and requesting that the voter provide the decrypted message. If the voter is able to provide the original message, the election content server delivers the election content to the voter.

As depicted in FIG. 5, the content digest, which is stored on the blockchain, may be used by voters to verify the election content in their posession is authentic. Hence, the voter may verify the election content by querying the blockchain. The voter also obtains the election rules, the registrar rules, and the secrecy key from the blockchain, typically using this same query that verified the election content. The voter may verify the query response using a Merkle proof. Also, as indicated by FIG. 5, the blockchain query response will provide any warnings to the voter.

Voters then may review the election content and rules. To do this, the voter accesses the blockchain, typically by using an application or applet such as a wallet app on the voter's digital phone, or an application on the voter's personal computer, or an election machine at a polling location.

At this point, precautions about the ballot, about voting, about the election, and other such matters are presented to the voter. There are numerous precautions that might be communicated to the voter, such as: warning the voter if the ballot is not fully completed by the voter; warning the voter if the blockchain cannot be reached or if the inquiry fails; warning the voter if the election content does not match the cryptographic digest of the election; warning the voter if the election content contained a short or weak series of random numbers; displaying the start and end of the voter's allowed time to cast a ballot; warning the voter if the election rules specify that the election content may change at a later time; warning the voter if the ballot cast will be unencrypted (and thus potentially visible to the world); or warning the voter that the election is to be encrypted, but that a secrecy key has not yet been provided by the registrar. Also, if it is indeed the case, the voter is typically warned that the voter's ballot will be cast unencrypted.

Other possible warnings are more complicated. For example, the voter might be warned that though the election is encrypted, if an end time for voting is not specified, at some point the secrecy key that is used to decrypt the votes will be revealed. When that happens, if the voter has not yet cast the ballot, the ballot cannot be safely encrypted because the secrecy private key will have been revealed. The ballot can still be cast, but the results update in real-time, lending some clues to the voter's identity or selections for anyone who knows when the voter cast the ballot.

Another example is warning the voter if the inquiry result cannot provide cryptographic proof of its integrity. When performing an inquiry on the blockchain, the inquiring software examines the "proof" that is returned with the inquiry result, and that proves the result is authentic to the blockchain's application state. The proof comes in the form a series of cryptographic digests that, when chained together and digested with a digest of the inquiry result itself, result in the root digest of the application state that is tracked and recorded on the blockchain. This allows users to prove the application state queried is authentic, without having to rebuild the application state from scratch by replaying the blockchain transactions since the beginning. Typically, the logistics of all of these inquires and notifications are managed by the application or applet used by the voter, meaning that most of the communication operates in the background, with the results presented to the voter for action.

As depicted in FIG. 5, the voter then votes about the matters presented by the ballot making his selections and completing a ballot. A fifth, "casting" transaction is submitted to the blockchain. The casting transaction includes the voter public key and the voter selections (as contained on the completed ballot), which may or may not be encrypted depending on the rules of the election, and a cryptographic signature of the fifth casting transaction created by the voter private key and verifiable with the voter public key.

The blockchain application examines the casting transaction and, if valid, modifies the application state to record that the ballot has been cast by the voter, and either increments the vote selection tallies directly in the application state for unencrypted voter selections, or appends the encrypted voter selections to a list of encrypted selections to be decrypted later. If invalid, the transaction is discarded and the application state is not modified. The casting transaction is invalid if, for example:

- any of the casting transaction signatures are missing or cannot be cryptographically verified;
- the ballot has already been cast with the provided voter public key;
- the election rules require that the voter selections be encrypted and the transaction contains unencrypted voter selections; or
- the election rules do not allow for encrypted voter selections, or the secrecy public key has not been set for the registrar, and the transaction contains encrypted voter selections.

According to some embodiments of the present systems, voters receive their ballots, make their selections, and cast their votes ballots electronically. This can be done using various methods and systems, such as election machines at polling places, specialized voting hardware, Internet web pages, voter computers, applications stored on voter devices such as phones and tablets, and other systems known in the art. FIGS. 7A-H depict screen shots of an exemplary mobile telephone application (or "wallet app") implementation of the current methods and systems.

Figure 7A:
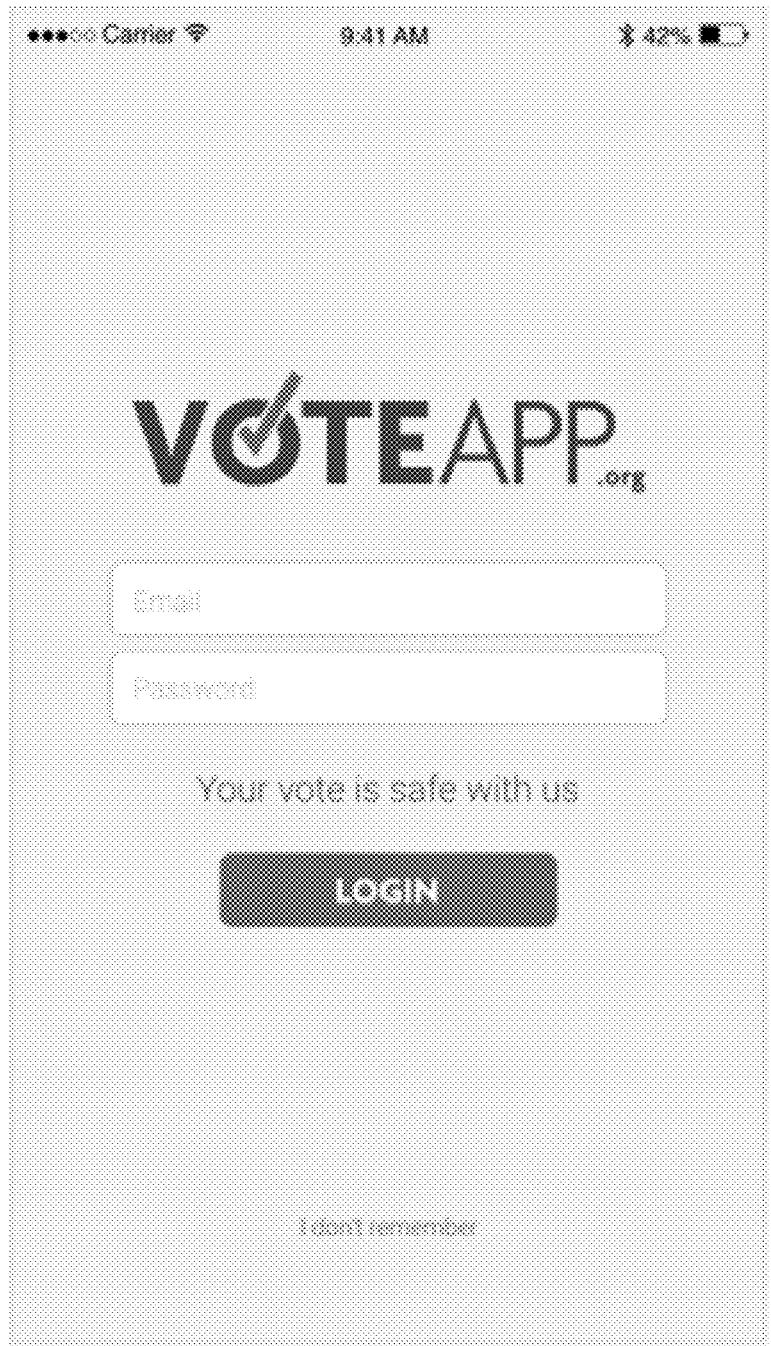
FIG. 7A depicts an exemplary initial login screen for a wallet app used in certain embodiments of a blockchain election system.

As depicted in FIG. 7A, when a voter 24 opens the wallet app on their mobile device, the wallet app presents an initial login screen to the voter. The voter must log in to the wallet app by filling in the relevant fields. In FIG. 7A, the fields are depicted as the voter's e-mail address and password for the wallet app, but other security methods could also be employed such as SSO (Single Sign On), facial recognition, or other biometrics. The voter then clicks the login button.

Figure 7B:
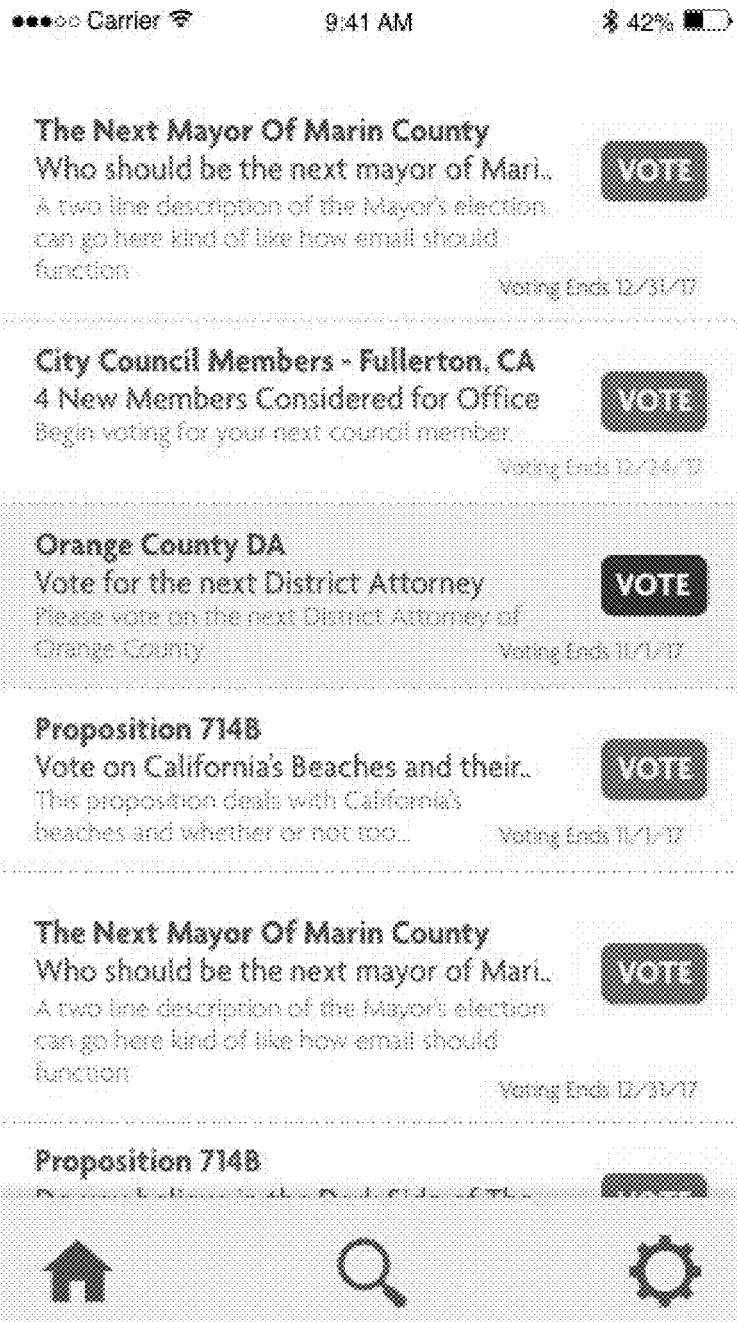
FIG. 7B depicts an exemplary list of elections in which the voter is registered to vote as presented by a wallet app used in certain embodiments of a blockchain election system.

After logging in, the voter may be advised of elections for which the voter has been allocated a ballot. FIG. 7B depicts an exemplary set of elections and polling topics on which the voter has an authorized ballot. FIG. 7B also provides some information about the respective ballots. The voting times displayed to the voter are obtained by querying the blockchain for the election and registrar rules associated to the issued ballot. The election title, subtitle, and descriptions are obtained from the election content, which is disseminated to the voter as described above.

Figure 7C:
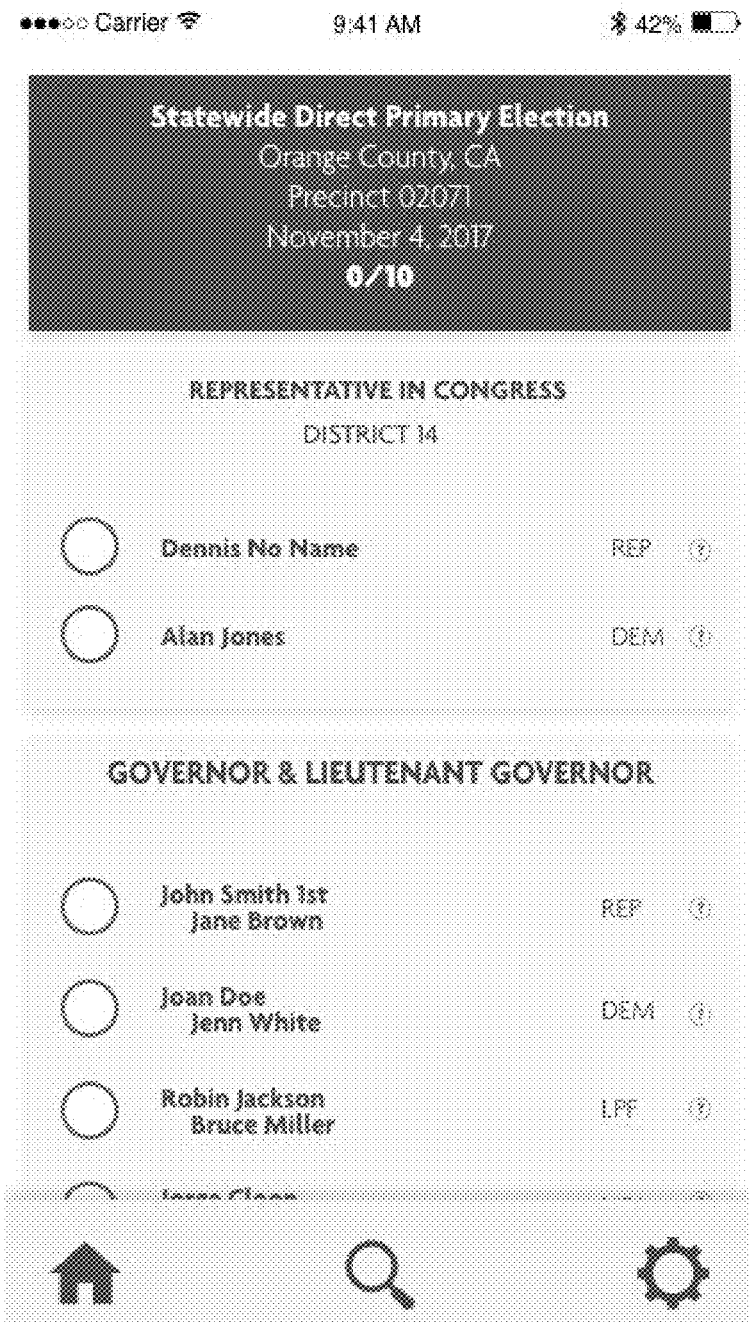
FIG. 7C depicts an exemplary ballot as presented by a wallet app used in certain embodiments of a blockchain election system.
Figure 7D:
FIG. 7D depicts an exemplary statement of additional information relating to the ballot of FIG. 7C as presented by a wallet app used in certain embodiments of a blockchain election system.

The voter selects the election upon which the voter intends to cast a ballot, and one or more vote pages appear on the voter's device. FIG. 7C depicts an exemplary set of candidates for voting, as well as a bit of information about the vote, in this example the elective office involved and the party of the candidate. If the voter wants more information, the voter can click a "?" image and the wallet app will bring up additional information. FIG. 7D depicts an image of an explanation for a legislative or voter initiative, permitting the voter to review what this particular vote entails. The information displayed to the user about the election topics, candidates, party affiliation, and additional information is also obtained from the election content that is disseminated to the voter.

Figure 7E:
FIG. 7E depicts an exemplary ballot as presented by a wallet app used in certain embodiments of a blockchain election system.
Figure 7F:
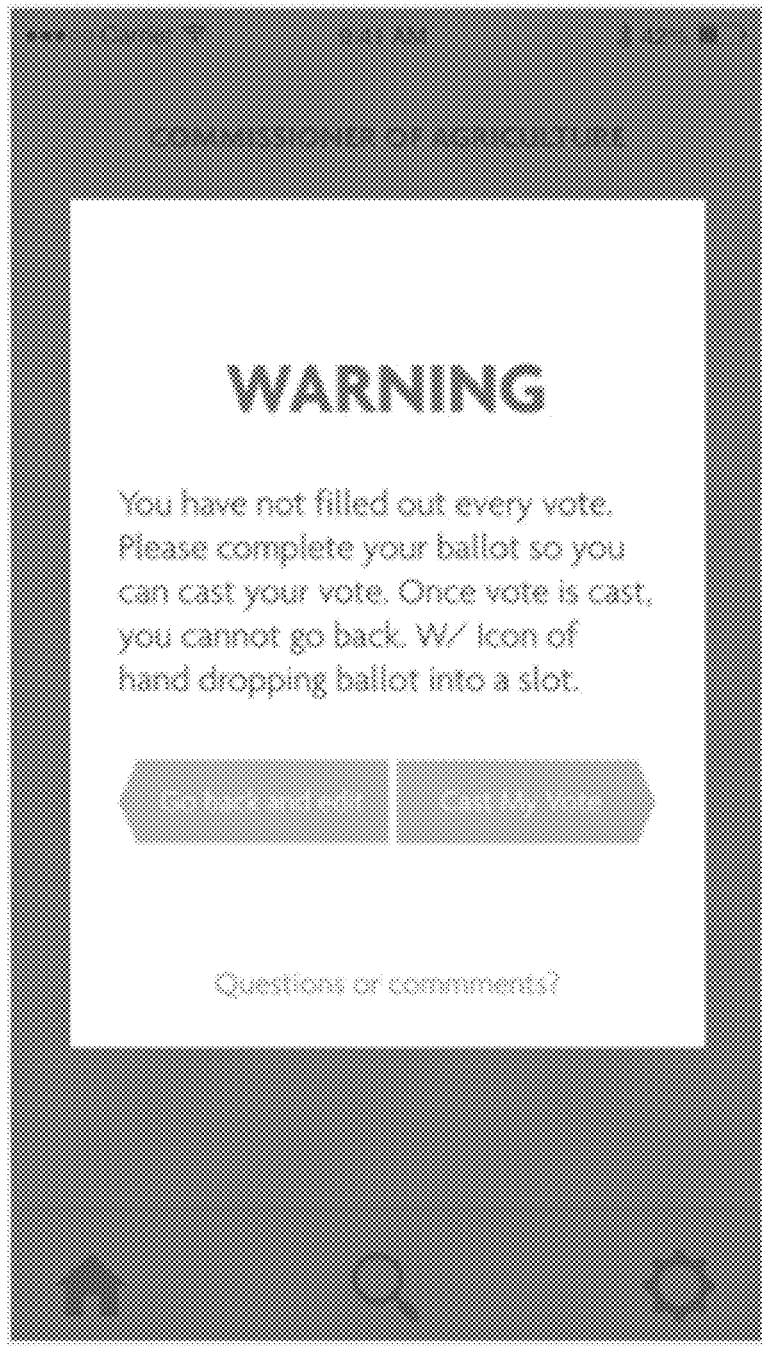
FIG. 7F depicts an exemplary warning relating to the ballot of FIG. 7C as presented by a wallet app used in certain embodiments of a blockchain election system.
Figure 7G:
FIG. 7G depicts an exemplary encrypting ballot screen as presented by a wallet app used in certain embodiments of a blockchain election system.

FIG. 7E depicts another exemplary voting screen, again allowing the voter to enter a vote in the indicated circles. Upon filling in the selected circles (if any), the voter clicks on the VOTE bar, entering the voter's choices. Should the voter not enter a vote, a warning screen may be presented to the voter, see FIG. 7F. Additional warnings may be presented to the voter either before or after making selections, prior to casting the ballot, if the election or registrar rules provide less than optimal security, as described above. As depicted in FIG. 7G, when a voter has completed (or at least passed) each vote screen, the voter's ballot is encrypted as described above.

Figure 7H:
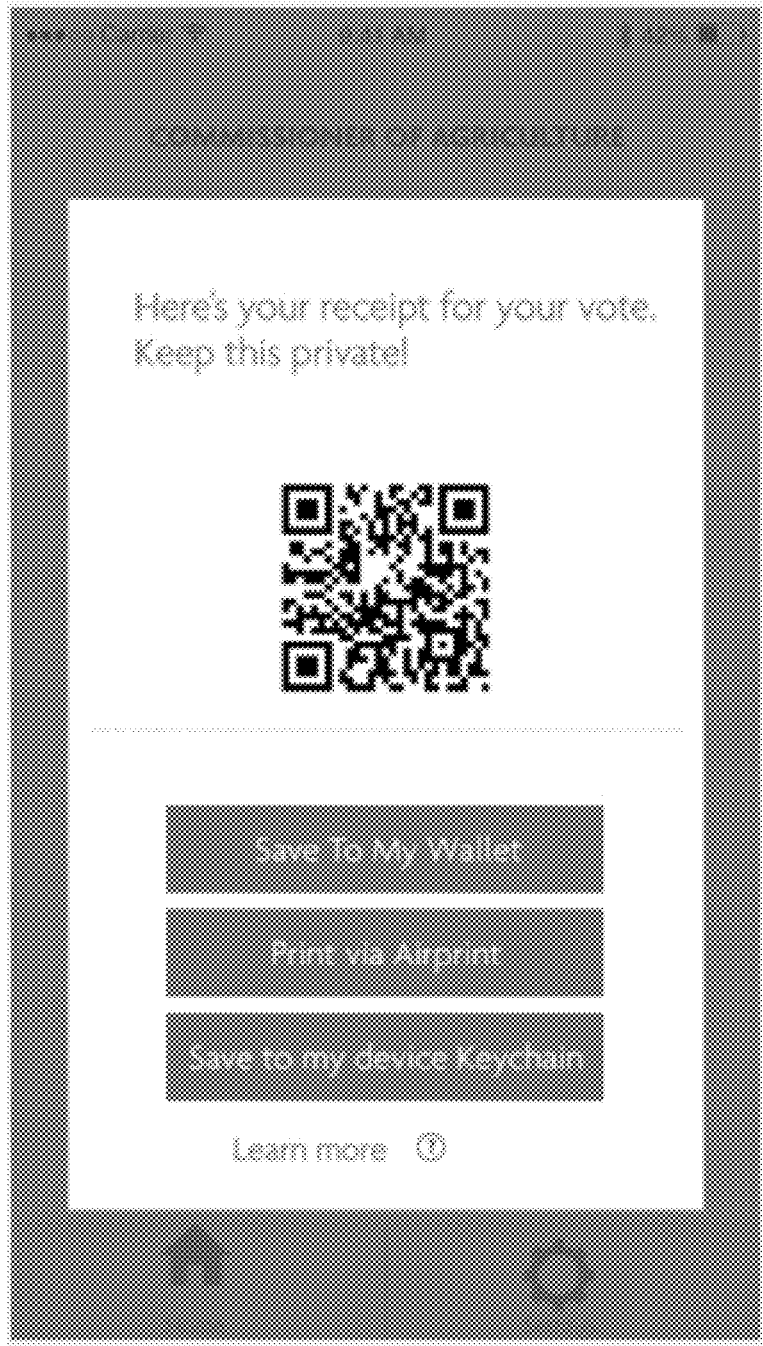
FIG. 7H depicts an exemplary receipt screen as presented by a wallet app used in certain embodiments of a blockchain election system.

The encrypted ballot is entered as a transaction on the blockchain, and the voter is presented with a receipt page, see FIG. 7H. The voter may save this receipt to the device's wallet or some other device, or printed by the voter. As noted in FIG. 7H, the voter may also be told to keep the bar code on the receipt page private, because the receipt may contain the voter's private key, the selections made by the voter, or a Merkle proof of the blockchain state. The content embedded into the receipt can be used to verify the ballot is cast as intended and reveal the selections made by the voter.

In other embodiments of the present methods, voters may use a paper ballot. One purpose of the digital application or applet is to secure the voter's private key. With that key (and with the knowledge of who the topics and candidates are) anyone could cast the voter's ballot. In some of these embodiments, to use a paper ballot, the voter would need to go online and generate a new key pair. The private key could be printed as a barcode and attached to the ballot the voter takes the polling location. Alternatively, the polling location could have a roll of randomly generated key pairs stored on stickers or cards. A voter would take a key from the roll to associate with the voter's ballot (likely by affixing it to the ballot). A poll worker authenticates the voter and scans the selected barcode with software that sends the ballot transaction (issuing the ballot to the voter) to the blockchain. The voter could then cast their ballot with any voting machine capable of reading their private key from the same barcode and sending a transaction to the blockchain. Such a system might involve a voting machine at the polling place. The voter walks up, scans the sticker at the polling booth, captures their votes for each selection on a touch screen, and the voting machine casts the ballot by sending it to the blockchain. A paper receipt may be printed and securely stored as a physical backup containing information such as the voter's public key, the registrar's public key, the election public key, the selections made by the voter, and a timestamp of when the ballot was cast.

Using this paper embodiment largely eliminates any risk of hacking of the voting machines or networks. For example, if the voting machine wireless connection had poor security, votes could be stolen or fabricated by hacking the connection. With the present method, votes can be sent in the clear over the internet without worry that the vote may be intercepted, lost, or hijacked. The vote is encrypted, so it cannot be hacked. The vote is also associated with a voter, so if the vote were lost or not counted, that could be reported or discovered by the voter. If the voting line is long or the voter wants to deliberate while deciding, after getting the sticker scanned by the poll worker, the voter could take the sticker home. The voter could then scan the ballot into a wallet app and cast the ballot from home.

Figure 8:
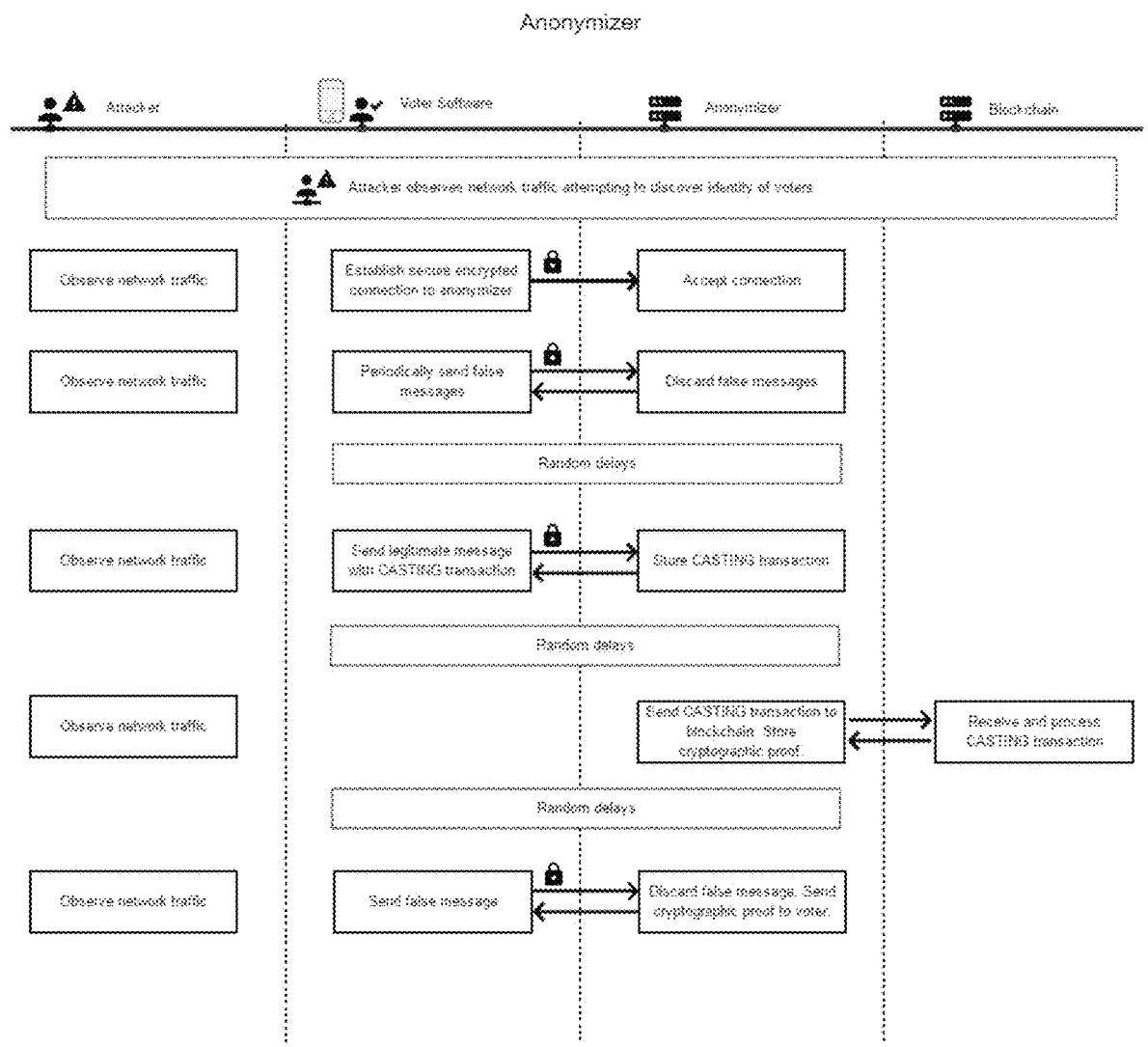
FIG. 8 depicts an exemplary view of a transactional design of an anonymizer according to certain embodiments of a blockchain election system.

As depicted in FIG. 8, in an alternate embodiment, the use of an anonymizer service may be employed to further obfuscate the identity of a voter by introducing timing delays, and false communication messages, to prevent an attacker, having visibility of the network traffic, from correlating information about the voter's identity such as location or IP address to the voter's public key. With the use of a trusted anonymizer service, the wallet app or other voting apparatus periodically, and at random intervals, initiates and maintains a securely encrypted connection to the anonymizer service, communicating false messages of similar size and nature to those used to cast a ballot, at times when the voter may not making selections or casting a ballot, both before and after the voter casts a ballot, and before and after the permitted voting period of the election. At the time the voter makes selections and casts the ballot, a legitimate request is sent to the anonymizer service to forward the casting transaction to the blockchain. The anonymizer service holds the transaction sent by the wallet app for an additional random period of time and then forwards the transaction to the blockchain. The anonymizer may perform an inquiry on the blockchain to obtain the cryptographic proof that the ballot was cast and hold the proof to later send to the voter. An attacker with visibility of the network traffic can see that a ballot was cast from the anonymizer's network location but cannot correlate the voter public key on the casting transaction to the network location of the voter who cast the ballot.

The ballots cast are then tallied. Tallying begins by submitting a "tally" transaction to the blockchain. The tally transaction comprises the registrar public key, the secrecy private key, and a cryptographic signature of the tally transaction created with the registrar private key and verifiable with the registrar public key.

The blockchain application examines the tally transaction, and if valid, uses the secrecy private key to decrypt, ballot by ballot through the blockchain's application state, every ballot cast from that registrar and encrypted with the secrecy public key for that registrar, decrypting each one, examining the voter's selections, and updating the master tally in the blockchain application state for each candidate or selection. Hence, the votes are decrypted, the votes are counted, the counted votes are stored, the blockchain application state is updated to include the updated tally of votes, and the updated application state thereby reveals the vote tally. If the tally transaction is invalid, the transaction is discarded and the application state is not modified. The tally transaction is invalid if, for example:

- any of the tally transaction signatures are missing or cannot be cryptographically verified;
- the votes have already been tallied for the specified registrar;
- the specified registrar does not have a secrecy public key; or
- the secrecy private key is missing or is not compatible with the secrecy public key.

After the ballots are all tallied, or, according to some embodiments of the present method, during tallying of the votes, the blockchain application state may be queried to obtain the then-current vote tallies. Theoretically, any member of the public would have the ability to make such a query, though in practice such querying may need to be limited at certain times, or, if the election itself is secret, restricted entirely to only those authorized to make such a query, and perhaps only at specific times.

In any event, queries into the tally result are typically made with an inquiry to the blockchain, the inquiry containing the election public key. The response to an inquiry typically contains the unique identifiers associated to each ballot, candidate or topic; and the total ballot counts cast for each candidate or topic. Without the election public key and the election content, a user can not discover this information; thus, the present methods allow for internal transparency and external opacity, so long as the election public key and election content is not disclosed. Though the election public key can be observed by monitoring blockchain transactions, because the votes are kept separate from the election content, without the election content, an intruder will know only the vote tallies, and have no idea what the vote tallies represent other than raw dimensionless numbers. Finally, the tally query response may be authenticated with a cryptographic proof, which is typically a Merkle proof.

According to another embodiment of the present method, some specific registrar rules established for conducting the election may be pertinent only to a designated registrar or less than all of the designated registrars. Such additional rules may include the earliest time voters may begin casting ballots for voters whose identity was validated by the designated registrar; the latest time voters may cast their ballots for voters whose identity was validated by the designated registrar; whether a voter's ballot issued by the designated registrar can be revoked or invalidated before the ballot is cast; whether a ballot cast by a voter is to be encrypted to be tallied at a later predetermined time; whether a ballot cast by a voter is to be unencrypted and tallied upon processing by the blockchain; if encrypted votes are allowed, generating a secrecy key pair for encrypting ballots when cast and for decrypting ballots when the ballots are tallied/counted; and if encrypted ballots are allowed, the time frame for when of the encrypted ballots may be tallied/counted.

According to other embodiments, some or all of the various transactions submitted to the blockchain can be combined into "larger" transactions, or can be split into "smaller" transactions. For example, the blockchain could be initialized, the election content prescribed, and the registrar or registrars authorized may all be done with a single transaction. If voter signatures can be properly arranged, the ballot issue transaction could also be combined into that single transaction. Conversely, the content transaction could be split into different parts, one transaction for the content digest, and other transactions for each of the election rules.

According to other embodiments, certain of the key pairs have the same values. For example, the owner key pair could be used for the election key pair and for the registrar key pair. The end result places more control directly on the owner key pair, but the election remains confidential. In some embodiments, all of the key pairs except the voter key pair are the same. The end result is similar to having a single person acting as blockchain owner, election content provider, registrar, and secret key owner, conduct the entire election.

Although particular embodiments of the present invention have been described, those of skill in the art will appreciate that various modifications and changes may be made by those skilled in the art without departing from the spirit and scope of the invention. The present invention may be embodied in other specific forms without departing from its structures, methods, or other essential characteristics as broadly described herein and claimed hereinafter. The described embodiments are to be considered in all respects only as illustrative, and not restrictive.

The invention claimed is:

1. A system for conducting an election comprising the elements of:
   - initializing a blockchain on which the election is to be conducted, the blockchain having an owner that controls an owner key pair comprised of an owner public key and an owner private key;
   - submitting an initialization transaction to the blockchain, the initialization transaction comprising:
     - the owner public key; and
     - a cryptographic signature of the initialization transaction created with the owner private key and verifiable with the owner public key;
   - recording the owner public key in an application state of the blockchain;
   - preparing the election by creating an election key pair to be used to establish election rules, the election key pair comprising an election private key and an election public key;
   - specifying content for the election, the specified election content including voting elements, the voting elements comprising at least one of a candidate, an initiative, a proposition, a topic, or an issue, the election content further including a series of random numbers;
   - establishing election rules under which the election is to be conducted, the election rules comprising at least one of:
     - i) setting an election voting period during which all ballots must be cast;
     - ii) determining whether voting elements may be added to the election content after the election is created, and, if so, when and what categories of voting elements may be added;

iii) determining whether a voter may cast a ballot for one or more voting elements not listed on the ballot;
iv) deciding whether vote tallies may be revealed before the election voting period ends;
v) determining whether the voter may vote for more than one voting element; and
vi) deciding whether votes are to be weighted differently for different voters or different classes of voters;

assigning a unique identifier to each voting element of the election content;
creating a content digest as a cryptographic digest of the election content; and
submitting a content transaction to the blockchain documenting the creation of such election, the content transaction comprising:
i) the election public key;
ii) the election rules;
iii) the content digest;
iv) a cryptographic signature of the content transaction created with the election private key and verifiable with the election public key;
v) a cryptographic signature of the content transaction created with the owner private key and verifiable with the owner public key; and
vi) a first nonce;

designating at least one registrar to authenticate voter identities and to issue ballots for the election;
creating a registrar key pair for each registrar, the registrar key pair comprising a registrar private key and a registrar public key;
creating a secrecy key pair for each registrar, each secrecy key pair comprising a secrecy private key and a secrecy public key;
determining a maximum number of ballots that the registrar may issue;
submitting a registrar transaction to the blockchain comprising:
(i) the registrar public key;
(ii) the number of ballots the registrar may issue;
(iii) any registrar rules;
(iv) a second nonce;
(v) a cryptographic signature of the registrar transaction created with the election private key and verifiable with the election public key; and
(vi) a cryptographic signature of the registrar transaction created with the registrar private key and verifiable with the registrar public key;

identifying at least one voter from a list maintained by the registrar;
notifying the at least one voter about the election, the notification comprising:
i) the election public key
ii) information regarding how the voter may communicate with the blockchain;
iii) the election content; and
iv) contact information for the registrar;

authenticating each voter identity by creating a unique voter key pair comprising a unique voter public key and a unique voter private key that is retained in a secure non-transitory medium trusted by that voter;
issuing a ballot for each voter by submitting an issue ballot transaction to the blockchain that comprises:
the voter public key;
a cryptographic signature of the issue ballot transaction created with the registrar private key and verifiable with the registrar public key; and
a cryptographic signature of the fourth issue ballot transaction created with the voter private key and verifiable with the voter public key;

enabling a voter to complete and to cast a ballot issued to that voter by:
accessing the blockchain;
submitting an inquiry to the blockchain to obtain the election rules and the content digest;
submitting an inquiry to the blockchain to obtain the registrar rules;
submitting an inquiry to the blockchain to validate that a ballot has been issued based on the voter public key and that that ballot has not been revoked or cast;
displaying precautions to the voter;
warning the voter if the blockchain cannot be reached or if the inquiry fails;
warning the voter if the inquiry result cannot provide cryptographic proof of its integrity;
warning the voter if the election content does not match the content digest;
warning the voter if the election content contained a weak series of random numbers;
displaying the election voting period;
warning the voter if the election rules specify that the election content may be modified;
warning the voter if an election is encrypted, but that the election voting period does not specify an end time;
warning the voter if the election is to be encrypted, but that a secrecy key has not yet been provided by the registrar; and
warning the voter if the ballot cast will be unencrypted;
submitting a casting transaction to the blockchain that comprises:
the voter public key;
the completed ballot encrypted with the secrecy public key; and
a cryptographic signature of the casting transaction created with the voter private key and verifiable with the voter public key;
displaying verification to the voter that the ballot was cast as intended, by sending a ballot inquiry to the blockchain, the ballot inquiry resulting in a ballot inquiry response that contains a cryptographic proof that the ballot inquiry response is authentic;
calculating a tally of the ballots cast;
revealing the tally by:
submitting a tally transaction to the blockchain comprising:
the registrar public key;
the secrecy private key; and
a cryptographic signature of the tally transaction created with the registrar private key and verifiable with the registrar public key;
using the secrecy private key to decrypt all ballots issued by the registrar;
counting votes on each ballot;
modifying the application state to include an updated tally of votes, thereby revealing the vote tally; and
querying the application state to obtain the vote tallies, the tally inquiry response comprising:
the tally for each voting element; and
a cryptographic proof of the authenticity of the tally inquiry response.

2. The system of claim 1 further comprising the elements of:
  establishing registrar rules for conducting the election that may be pertinent only to a designated registrar, the additional rules comprising at least one of:
    (1) an election voting period for the ballots issued by the designated registrar;
    (2) whether a voter's ballot issued by the designated registrar can be revoked before the ballot is cast; and
    (3) a time frame for tallying of encrypted ballots.

3. The method of claim 1 further comprising the element of modifying the rules of the election after the election is created in accordance with at least one of:
  if permitted by the election rules;
  modifying the election content;
  modifying the number of votes that can be issued by a registrar;
  creating additional registrars; and
  revoking ballots that have been issued by a registrar;
  by submitting a modification transaction to the blockchain containing:
    i) encoding of the modified rules; and
    ii) a nonce.

4. The method of claim 1 wherein the secure non-transitory medium is a digital wallet application holding the voter private key on a mobile device or other, password protected device.

5. The method of claim 1 wherein the secure non-transitory medium is stored by a service trusted by the voter to secure and backup the voter private key for voting.

6. The system of claim 1 wherein blockchain application logic ensures that a registrar cannot issue ballots in excess of the number of ballots allotted to that registrar.

7. The system of claim 1 further comprising an anonymizer to protect voter identity.

8. A system for conducting an election comprising the elements of:
  a blockchain;
  submitting a content transaction to the blockchain documenting the creation of such election, the content transaction comprising:
    i) the election public key;
    ii) the election rules;
    iii) the content digest;
    iv) a cryptographic signature of the content transaction created with the election private key and verifiable with the election public key;
    v) a cryptographic signature of the content transaction created with an owner private key and verifiable with an owner public key; and
    vi) a first nonce;
  designating at least one registrar to authenticate voter identities and to issue ballots for the election;
  creating a registrar key pair for each registrar, the registrar key pair comprising a registrar private key and a registrar public key;
  submitting a registrar transaction to the blockchain comprising:
    (i) the registrar public key;
    (ii) the number of ballots the registrar may issue;
    (iii) any registrar rules;
    (iv) a second nonce;
    (v) a cryptographic signature of the registrar transaction created with the election private key and verifiable with the election public key; and
    (vi) a cryptographic signature of the registrar transaction created with the registrar private key and verifiable with the registrar public key;
  identifying at least one voter from a list maintained by the registrar;
  notifying the at least one voter about the election, the notification comprising:
    i) the election public key
    ii) information regarding how the voter may communicate with the blockchain;
    iii) the election content; and
    iv) contact information for the registrar;
  authenticating each voter identity by creating a unique voter key pair comprising a unique voter public key and a unique voter private key that is retained in a secure non-transitory medium trusted by that voter;
  issuing a ballot for each voter by submitting an issue ballot transaction to the blockchain that comprises:
    the voter public key;
    a cryptographic signature of the issue ballot transaction created with the registrar private key and verifiable with the registrar public key; and
    a cryptographic signature of the issue ballot transaction created with the voter private key and verifiable with the voter public key;
  enabling a voter to complete and to cast a ballot issued to that voter by:
    accessing the blockchain;
    submitting an inquiry to the blockchain to obtain the election rules and the content digest;
    submitting an inquiry to the blockchain to obtain the registrar rules;
    submitting an inquiry to the blockchain to validate that a ballot has been issued based on the voter public key and that that ballot has not been revoked or cast;
  submitting a casting transaction to the blockchain that comprises:
    the voter public key;
    the completed ballot; and
    a cryptographic signature of the casting transaction created with the voter private key and verifiable with the voter public key;
  calculating a tally of the ballots cast; and
  revealing the tally by:
    counting votes on each ballot; and
    modifying the application state to include an updated tally of votes, thereby revealing the vote tally.

9. The system of claim 8 further comprising the steps of:
  displaying precautions to the voter;
  warning the voter if the blockchain cannot be reached or if the inquiry fails;
  warning the voter if the inquiry result cannot provide cryptographic proof of its integrity;
  warning the voter if the election content does not match the content digest;
  warning the voter if the election content contained a weak series of random numbers;
  displaying the election voting period;
  warning the voter if the election rules specify that the election content may be modified;
  warning the voter if an election is encrypted, but that the election voting period does not specify an end time;
  warning the voter if the election is to be encrypted, but that a secrecy key has not yet been provided by the registrar; and
  warning the voter if the ballot cast will be unencrypted.

10. The system of claim 8 further comprising preparing the election by creating an election key pair to be used to establish election rules, the election key pair comprising an election private key and an election public key.

11. The system of claim 8 further comprising specifying content for the election, the specified election content including voting elements, the voting elements comprising at least one of a candidate, an initiative, a proposition, a topic, or an issue, the election content further including a series of random numbers.

12. The system of claim 8 further comprising establishing election rules under which the election is to be conducted, the election rules comprising at least one of:
   i) setting an election voting period during which all ballots must be cast;
   ii) determining whether voting elements may be added to the election content after the election is created, and, if so, when and what categories of voting elements may be added;
   iii) determining whether a voter may cast a ballot for one or more voting elements not listed on the ballot;
   iv) deciding whether vote tallies may be revealed before the election voting period ends;
   v) determining whether the voter may vote for more than one voting element; and
   vi) deciding whether votes are to be weighted differently for different voters or different classes of voters.

13. The system of claim 8 further comprising determining a maximum number of ballots that the registrar may issue.

14. The system of claim 8 further comprising an owner key pair comprised of an owner public key and an owner private key, the owner key pair used to initialize the blockchain by submitting a tally transaction to the blockchain, the tally transaction comprising:
   the owner public key; and
   a cryptographic signature of the tally transaction created with the owner private key and verifiable with the owner public key;
   recording the owner public key in an application state of the blockchain;
   assigning a unique identifier to each voting element of the election content; and
   creating a content digest as a cryptographic digest of the election content.

15. The system of claim 8 further comprising the use of a secrecy key pair having a secrecy public key and a secrecy private key to permit encryption of ballots and maintain confidentiality of vote tallies until such time as the tallies are to be revealed.

16. The system of claim 15 further comprising a secrecy transaction submitted to the blockchain comprising:
   the registrar public key;
   the secrecy private key; and
   a cryptographic signature of the secrecy transaction created with the registrar private key and verifiable with the registrar public key; and
   using the secrecy private key to decrypt all ballots issued by the registrar.

17. The system of claim 8 further comprising displaying verification to the voter that the ballot was cast as intended, by sending a ballot inquiry to the blockchain, the ballot inquiry resulting in a ballot inquiry response that contains a cryptographic proof that the ballot inquiry response is authentic.

18. The system of claim 8 further comprising querying the application state to obtain the vote tallies, the tally inquiry response comprising:
   the tally for each voting element; and
   a cryptographic proof of the authenticity of the tally inquiry response.

19. A system for conducting an election comprising the elements of:
   a blockchain;
   submitting at least one transaction to the blockchain, the at least one transaction configured to perform at least one of:
      initialize the blockchain for use with the election;
      provide election content and election rules to the blockchain documenting the creation of such election;
      designate at least one registrar to authenticate voter identities and to issue ballots for the election; and
      issue at least one ballot to at least one voter;
   and further comprising the steps of:
   displaying precautions to the voter;
   warning the voter if the blockchain cannot be reached or if the inquiry fails;
   warning the voter if the inquiry result cannot provide cryptographic proof of its integrity;
   warning the voter if the election content does not match the content digest;
   warning the voter if the election content contained a weak series of random numbers;
   displaying the election voting period;
   warning the voter if the election rules specify that the election content may be modified;
   warning the voter if an election is encrypted, but that the election voting period does not specify an end time;
   warning the voter if the election is to be encrypted, but that a secrecy key has not yet been provided by the registrar; and
   warning the voter if the ballot cast will be unencrypted.

20. The system of claim 19 further comprising preparing the election by creating an election key pair to be used to establish election rules, the election key pair comprising an election private key and an election public key.

21. The system of claim 19 further comprising specifying content for the election and storing at least one of the content and a digest of the content on the blockchain, the specified election content including voting elements, the voting elements comprising at least one of a candidate, an initiative, a proposition, a topic, or an issue, the election content further including a series of random numbers.

22. The system of claim 19 further comprising establishing election rules under which the election is to be conducted and storing the election rules on the blockchain.

23. The system of claim 19 further comprising the use of a secrecy key pair having a secrecy public key and a secrecy private key to permit encryption of ballots and maintain confidentiality of vote tallies until such time as the tallies are to be revealed.

24. The system of claim 19 further comprising a secrecy transaction submitted to the blockchain comprising:
   the registrar public key;
   the secrecy private key; and
   a cryptographic signature of the secrecy transaction created with the registrar private key and verifiable with the registrar public key; and
   using the secrecy private key to decrypt all ballots issued by the registrar.

\* \* \* \* \*